(12) United States Patent
Xu et al.

(10) Patent No.: US 10,423,979 B2
(45) Date of Patent: Sep. 24, 2019

(54) SYSTEMS AND METHODS FOR A FRAMEWORK FOR GENERATING PREDICTIVE MODELS FOR MEDIA PLANNING

(71) Applicant: Rovi Guides, Inc., San Carlos, CA (US)

(72) Inventors: Xiaoxi Xu, Chestnut Hill, MA (US); Steven D. Bennett, Somerville, MA (US)

(73) Assignee: Rovi Guides, Inc., San Jose, CA (US)

( * ) Notice: Subject to any disclaimer, the term of this patent is extended or adjusted under 35 U.S.C. 154(b) by 266 days.

(21) Appl. No.: 15/393,722

(22) Filed: Dec. 29, 2016

(65) Prior Publication Data

US 2018/0189826 A1    Jul. 5, 2018

(51) Int. Cl.
*G06Q 30/02* (2012.01)
*H04N 21/81* (2011.01)
(Continued)

(52) U.S. Cl.
CPC ......... *G06Q 30/0254* (2013.01); *G06Q 10/04* (2013.01); *G06Q 10/0637* (2013.01);
(Continued)

(58) Field of Classification Search
CPC ........... G06Q 30/0244; G06Q 30/0245; G06Q 30/0246; G06Q 30/0247; G06Q 30/0249;
(Continued)

(56) References Cited

U.S. PATENT DOCUMENTS 6,239,794 B1    5/2001 Yuen et al.
6,564,378 B1    5/2003 Satterfield et al.
(Continued)

OTHER PUBLICATIONS

Brownlee, Jason, Why Initialize a Neural Network with Random Weights?, dated Aug. 1, 2018, and downloaded Nov. 9, 2018 from https://machinelearningmastery.com/why-initialize-a-neural-network-with-random-weights/ (Year: 2018).*
Bhave et al., "Television rating point prediction using neural network," Int'l Journal of Innovative Science, Engineering & Technology, 2(10):714-717 (2015).

*Primary Examiner* — Scott D Gartland
(74) *Attorney, Agent, or Firm* — Haley Guiliano LLP

(57) ABSTRACT

Systems and methods for a framework for generating predictive models for media planning. In some aspects, control circuitry receives, from a database, reference data associated with a program. The control circuitry receives a future date for insertion of an advertisement during transmission of the program. The control circuitry determines a prediction period between a current date and the future date. The control circuitry determines whether the prediction period exceeds a threshold period. If the prediction period does not exceed the threshold period, the control circuitry selects a first type for a predictive model. If the prediction period exceeds the threshold period, the control circuitry selects a second type for the predictive model. The control circuitry trains the predictive model according to the selected type and based on the reference data. The control circuitry predicts, based on the predictive model, an average audience for insertion of the advertisement.

28 Claims, 7 Drawing Sheets

(51) Int. Cl.
*H04N 21/2543* (2011.01)
*G06Q 10/04* (2012.01)
*G06Q 10/06* (2012.01)

(52) U.S. Cl.
CPC ..... *G06Q 30/0244* (2013.01); *G06Q 30/0247* (2013.01); *G06Q 30/0272* (2013.01); *H04N 21/25435* (2013.01); *H04N 21/812* (2013.01); *G06Q 30/0241* (2013.01); *G06Q 30/0242* (2013.01)

(58) Field of Classification Search
CPC ........... G06Q 30/0272; G06Q 30/0273; G06Q 30/0254; G06Q 30/0241; G06Q 30/0242; G06Q 10/04; G06Q 10/637; H04N 21/812; H04N 21/25435
USPC ......... 705/14.43, 14.44, 14.45, 14.46, 14.48, 705/14.68, 14.69, 14.52
See application file for complete search history.

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2004/0181370 A1* | 9/2004 | Froehlich | G06F 9/5083 702/187 |
| 2005/0251827 A1 | 11/2005 | Ellis et al. | |
| 2008/0154821 A1 | 6/2008 | Poulin | |
| 2010/0153885 A1 | 6/2010 | Yates | |
| 2012/0084142 A1* | 4/2012 | Li | G06O 30/02 705/14.46 |
| 2013/0080374 A1* | 3/2013 | Karlsson | G06Q 10/04 706/52 |
| 2016/0300141 A1* | 10/2016 | Veeraragavan | G06Q 30/02 |

* cited by examiner

SYSTEMS AND METHODS FOR A FRAMEWORK FOR GENERATING PREDICTIVE MODELS FOR MEDIA PLANNING

BACKGROUND

Traditionally, problems in the media planning space have been addressed separately from first principles on a per-problem basis. For example, a problem in the media planning space may be inserting an advertisement during transmission of a particular channel or a program where the target consumer is likely to view the advertisement. A possible approach to this problem may be a predictive solution conceived to particularly address this problem. However, one size may not fit all, and therefore it may hard to reuse the predictive solution approach for another problem in the same or another space. This is because the predictive solution approach may vary from data to data, product to product, and industry to industry. Accordingly, there is a need for a framework for generating customized predicting models, within the media planning space, as well as in other spaces where predictive solutions may be valuable.

SUMMARY

To address these shortcomings, the systems and methods described provide for a universal framework for generating efficient and effective customized predicting models within the media planning space. The framework may be used to design and prototype predictive solutions in the media planning space, but this framework may be also equally applicable in other spaces where predictive solutions may be valuable. The framework may receive input in the form of client requirement data, set-top box data, ratings data, television schedule data, or any other suitable data relevant to the predictive solution. The framework may output parameters such as model type and training data and size for a predictive model, such as a machine learning model. The predictive models may include artificial neural networks, hierarchical models of time-series regression, Fourier transform, robust probabilistic sequencing models, or another model suitable for the predictive solution.

In some aspects, the described framework includes three modules, a characterizer, an evaluator, and a recommender. The characterizer module helps identify problem characteristics and predictive goals in order to effectively define a machine learning prediction problem. The characterizer determines future-driven and/or history-driven parameters for the model. The future-driven parameters relate to the future predictions that are output from the model. The history-driven parameters relate to the historical training data that is input into the model.

The characterizer may determine future-driven parameters such as a prediction granularity and a prediction look-ahead period (alternatively referred to as a prediction period or a look-ahead period). The prediction granularity is the fluctuation pattern or interval for the prediction, e.g., an average audience for a program. The prediction granularity may be daily, weekly, monthly, quarterly, or another suitable interval. The prediction look-ahead period is the period between the current date and the future date for the advertisement to be inserted during transmission of the program. For example, the prediction look-ahead period may be one week, 10 weeks, one month, six months, or another suitable period.

The characterizer may determine history-driven parameters such as a history granularity for historical program data, a historical data type, and a look-back period. The history granularity is the interval for sampling the historical program data. For example, the historical program data may have been captured at a daily interval, a weekly interval, a monthly interval, or another suitable interval. The history granularity may be assigned based on a mapping table such that the history granularity is not greater than the prediction granularity. For example, if the prediction granularity is determined to be monthly or quarterly, the history granularity may be assigned as weekly. In another example, if the prediction granularity is determined to be daily or weekly, the history granularity may be assigned as daily.

The historical data type may be program-based or time-based. The program-based historical data type corresponds to prediction data indexed by a program title. The time-based historical data type corresponds to prediction data indexed by a timeslot for the program. For example, if the look-ahead period is greater than six months, program schedule data may not be available for the program. Alternatively, even with a smaller look-ahead period, program schedule data may not be available for the program. In these cases, the historical data type may be assigned as time-based. The predictive model may utilize data corresponding to the daily average audience for that timeslot in order to make its predictions. If schedule data is available for the program, the historical data type may be assigned as program-based.

The look-back period determines the extent to which the historical program data is needed as training data for the model. For example, a look-back period of 12 weeks may be sufficient in the case where the look-ahead period is two weeks or less and the historical data type is time-based. In another example, a look-back period of 10 program timeslots or airings may be sufficient in the case where the look-ahead period is two weeks or less and the historical data type is program-based. In yet another example, the look-back period may be determined based on historical availability of set-top box viewership data and/or ratings data (e.g., Nielsen® ratings data). The set-top box viewership data may be individual respondent level data. The ratings data may be aggregated data from a plurality of respondents. If the look-ahead period is between two weeks and six months, the look-back period may be the longer of one year and the historical availability of set-top box viewership data and/or ratings data. If the look-ahead period is greater than six months, the look-back period may be the longer of two years and the historical availability of set-top box viewership data and/or ratings data.

The evaluator module evaluates model feasibility and suitability based on the problem characteristics revealed by the characterizer module. The key to developing predictive solutions effectively and efficiently is a precise understanding of the assumptions, strengths, and limitations of machine learning models. For example, a Fourier transform model may require regular time series data to predict effectively (e.g., equally spaced data of daily frequency). An artificial neural network may excel at short-term predictions. Probabilistic sequential models (e.g., Markov models) may be robust because they make no assumption of the regularity of the event sequence data and can predict over longer terms. Such models may be capable of identifying outliers as low-transition probability events.

For example, if the look-ahead period is greater than six months, the evaluator module may select from a Fourier transform model and a Markov model because both are appropriate for long-term predictions. Because the Fourier transform model may require regular time series training data, the evaluator module may select this model if the history granularity and prediction granularity are both determined to be daily. Otherwise, the evaluator module may select the Markov model because it does not require regularity in the training data. If the look-ahead period is between two weeks and six months, the evaluator module may select the Markov model as well. If the look-ahead period is less than two weeks, the evaluator module may select an artificial neural network model because it is better at short-term predictions.

The recommender module assimilates the outputs from the two other modules and makes recommendations based on suitable predictive models. This module may recommend the most desirable machine learning model based on the outputs from the characterizer module and the evaluator module. In the event that more than one model is recommended, further research may be performed to efficiently navigate this more compact space and identify the most desirable solution. For example, a Fourier transform model may be recommended for long-term predictions using regular daily viewership data (i.e., time-based) without the knowledge of program level information (i.e., program-based). In another example, an artificial neural network model may be recommended for short-term predictions two weeks into the future for each program title. The recommender module may additionally recommend training data and size of the past 10 program airings of program-based viewership. In yet another example, a Fourier transform model may be recommended for long-term predictions six months into the future for daily average audiences. The recommender module may additionally recommend training data and size of the past two years of time-based daily average audiences.

The systems and methods described herein may be implemented in an interactive media guidance application that is executed on control circuitry of one or more user devices and/or one or more servers. For example, the interactive media guidance application may be executed on control circuitry of a set-top box, a mobile phone, or another suitable user device. In another example, the interactive media guidance application may be executed on control circuitry of a set-top box and control circuitry of a mobile phone. Each user device may execute stand-alone instances of the interactive media guidance application or each user device may execute different portions of the interactive media guidance application.

In some aspects, the systems and methods described herein provide for a method for predicting an average audience that can inform a future advertisement rate for insertion of an advertisement during transmission of a program on a future date. The method may be implemented on control circuitry of one or more of a user device, a server, or another suitable device. The control circuitry receives, from a database, reference data associated with a program. The control circuitry receives a future date for insertion of an advertisement during transmission of the program. The control circuitry determines a prediction period based on the future date. The prediction period includes a period between a current date and the future date. The control circuitry determines whether the prediction period exceeds a threshold period. Based on determining that the prediction period does not exceed the threshold period, the control circuitry selects a first type for a predictive model. Based on determining that the prediction period exceeds the threshold period, the control circuitry selects a second type for the predictive model. The control circuitry trains the predictive model according to the selected type and based on the reference data. The control circuitry predicts, based on the predictive model, a future average audience for insertion of the advertisement during transmission of the program on the future date.

In some aspects, the systems and methods described herein provide for a method system for predicting an average audience that can inform a future advertisement rate for insertion of an advertisement during transmission of a program on a future date. The method may be implemented on control circuitry of one or more of a user device, a server, or another suitable device. The control circuitry receives, from a database, reference data associated with a program. The reference data includes past schedule data for the program and associated average audiences. The control circuitry receives a future date for insertion of an advertisement during transmission of the program. The control circuitry determines a prediction period based on the future date. The prediction period includes a period between a current date and the future date. The control circuitry determines whether the prediction period exceeds a threshold period. Based on determining that the prediction period does not exceed the threshold period, the control circuitry selects a first type for a predictive model. Based on determining that the prediction period exceeds the threshold period, the control circuitry selects a second type for the predictive model.

Subsequent to selecting one of the first type and the second type, the control circuitry trains the predictive model by performing the following steps. The control circuitry generates the predictive model according to the selected type. The control circuitry inputs, into the predictive model, a portion of the past schedule data for the program from the reference data. The control circuitry generates, based on the predictive model, predicted average audiences associated with the portion of the past schedule data. The control circuitry determines a deviation between the predicted average audiences and average audiences associated with the portion of the past schedule data. The control circuitry updates the predictive model based on the deviation.

Subsequent to the training of the predictive model, the control circuitry predicts an average audience (or a size of program viewing audience) that can inform a future advertisement rate for insertion of the advertisement during transmission of the program on the future date. The control circuitry inputs, into the predictive model, future schedule data associated with the transmission of the program on the future date. The control circuitry generates, based on the predictive model, the average audience (or the size of program viewing audience) that can inform the future advertisement rate associated with the future schedule data.

In some embodiments, prior to predicting the average audience (or the size of program viewing audience), the control circuitry determines whether the deviation exceeds a threshold deviation. Based on determining that the deviation exceeds the threshold deviation, the control circuitry retrains the predictive model. For example, if the deviation exceeds the threshold deviation, the predictive model may not be accurate enough to be usable for future predictions. By retraining the model on the same training data, the deviation may be reduced and the predictive model may be made more accurate.

In some embodiments, the control circuitry retrains the predictive model by performing the following steps. The control circuitry inputs, into the predictive model, the portion of the past schedule data for the program from the reference data. The control circuitry generates, based on the predictive model, second predicted average audiences associated with the portion of the past schedule data. The control circuitry determines a second deviation between the second predicted average audiences and the average audiences associated with the portion of the past schedule data. The control circuitry updates the predictive model based on the second deviation.

In some embodiments, the control circuitry generates the predictive model according to the selected type by initializing one or more parameters of the predictive model to a random value. For example, the control circuitry may set the weights of an artificial neural network to random values in order to initialize the artificial neural network.

In some embodiments, the first type of the predictive model is suitable for a short-term prediction during a period that does not exceed the threshold period. For example, the threshold period may be two weeks and predictions for a period of two weeks or less may be considered to be short-term predictions. The first type of predictive model may be an artificial neural network suitable for short-term predictions.

In some embodiments, the second type of the predictive model is suitable for a long-term prediction during a period that exceeds the threshold period. For example, the threshold period may be two weeks and predictions for a period of greater than two weeks may be considered to be long-term predictions. The second type of predictive model may be a Markov model network suitable for long-term predictions.

In some embodiments, the control circuitry determines whether the prediction period exceeds a second threshold period. Based on determining that the prediction period exceeds the second threshold period, the control circuitry designates the historical data type to be time-based. The time-based historical data type corresponds to data indexed by a timeslot for the program. For example, if the look-ahead period is greater than six months, schedule data may not be available for the program. In this case, the historical data type may be assigned as time-based. The predictive model may utilize data corresponding to the daily average audience for that timeslot in order to make its predictions.

In some embodiments, based on determining that the prediction period does not exceed the second threshold period, the control circuitry transmits, to the database, a search request for future schedule data for the program. Based on receiving no future schedule data for the program, the control circuitry designates a historical data type to be time-based. Based on receiving the future schedule data for the program, the control circuitry designates the historical data type to be program-based. The program-based historical data type corresponds to data indexed by a program title. For example, if schedule data is available for the program, the historical data type may be assigned as program-based. If schedule data is not available for the program, the historical data type may be assigned as time-based.

In some embodiments, the control circuitry determines a look-back period based on the prediction period and the historical data type. In some embodiments, the portion of the past schedule data for the program is selected based on the look-back period. The look-back period determines the extent to which the historical program data is needed as training data for the model. For example, a look-back period of 12 weeks may be sufficient in the case where the prediction period is two weeks or less and the historical data type is time-based. In another example, a look-back period of 10 program timeslots or airings may be sufficient in the case where the prediction period is two weeks or less and the historical data type is program-based. In yet another example, the look-back period may be determined based on historical availability of set-top box viewership data and/or ratings data (e.g., Nielsen® ratings data). The set-top box viewership data may be individual respondent level data. The ratings data may be aggregated data from a plurality of respondents. If the prediction period is between two weeks and six months, the look-back period may be the longer of one year and the historical availability of set-top box viewership data and/or ratings data. If the prediction period is greater than six months, the look-back period may be the longer of two years and the historical availability of set-top box viewership data and/or ratings data.

The systems and methods described herein address the problem of generating a customized predictive model within the media planning space. Conventional methods may include generating multiple models and selecting the most accurate model from the multiple models. However, there is no assurance that the multiple generated models include a model that is most suitable for the problem being addressed. The most accurate of the multiple models may still not be the most suitable model for the problem and may still have accuracy lower than the most suitable model. By determining the most appropriate parameters for the problem and then generating the model based on those parameters, the described systems and methods determine the most suitable model for the problem. The most suitable model type is determined and then trained with the training data to generate a predictive solution that is likely to have the most accuracy.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for a framework for generating predictive models for media planning. In some aspects, the systems and methods described herein provide for a method for predicting an average audience (or a size of program viewing audience) that can inform a future advertisement rate for insertion of an advertisement during transmission of a program on a future date. The method may be implemented on control circuitry of one or more of a user device, a server, or another suitable device. The control circuitry receives, from a database, reference data associated with a program. The control circuitry receives a future date for insertion of an advertisement during transmission of the program. The control circuitry determines a prediction period based on the future date. The prediction period includes a period between a current date and the future date. The control circuitry determines whether the prediction period exceeds a threshold period. Based on determining that the prediction period does not exceed the threshold period, the control circuitry selects a first type for a predictive model. Based on determining that the prediction period exceeds the threshold period, the control circuitry selects a second type for the predictive model. The control circuitry trains the predictive model according to the selected type and based on the reference data. The control circuitry predicts, based on the predictive model, a future average audience for insertion of the advertisement during transmission of the program on the future date.

Figure 1:
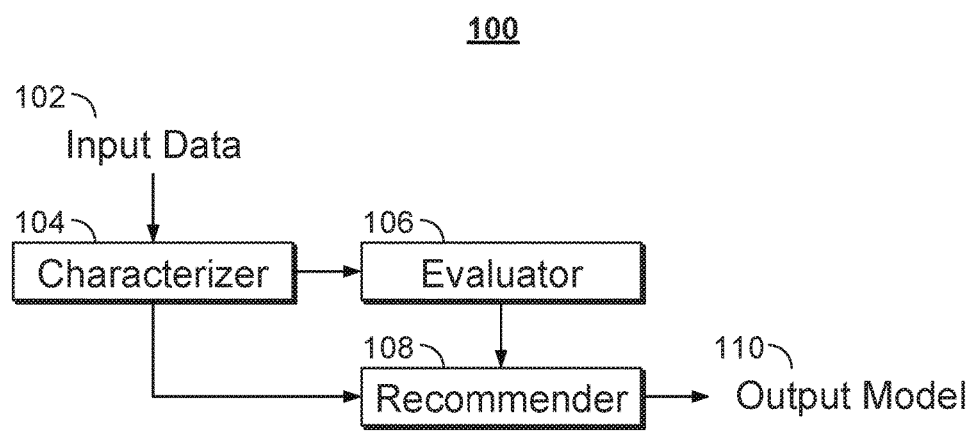
FIG. 1 shows an illustrative block diagram of a framework for generating predictive models for media planning in accordance with some embodiments of the disclosure.

FIG. 1 shows an illustrative block diagram of a framework 100 for generating predictive models 110 based on training data 102 in accordance with some embodiments of the disclosure. The described framework 100 includes three modules, a characterizer module 104, an evaluator module 106, and a recommender module 108. The characterizer module 104 helps identify problem characteristics and predictive goals in order to effectively define a machine learning prediction problem. The characterizer module 104 determines future-driven and/or history-driven parameters for the model.

The characterizer module 104 determines future-driven parameters such as a prediction granularity and a prediction look-ahead period (alternatively referred to as a prediction period or a look-ahead period). The prediction granularity may be daily, weekly, monthly, quarterly, or another suitable interval. The prediction look-ahead period may be one week, 10 weeks, one month, six months, or another suitable period.

The characterizer module 104 determines history-driven parameters such as a history granularity for historical program data, a historical data type, and a look-back period. The historical program data may have been captured at a daily interval, a weekly interval, a monthly interval, or another suitable interval. The history granularity may be assigned based on a mapping table such that the history granularity is not greater than the prediction granularity. If the prediction granularity is determined to be monthly or quarterly, the history granularity may be assigned as weekly. In another example, if the prediction granularity is determined to be daily or weekly, the history granularity may be assigned as daily.

Figure 2:
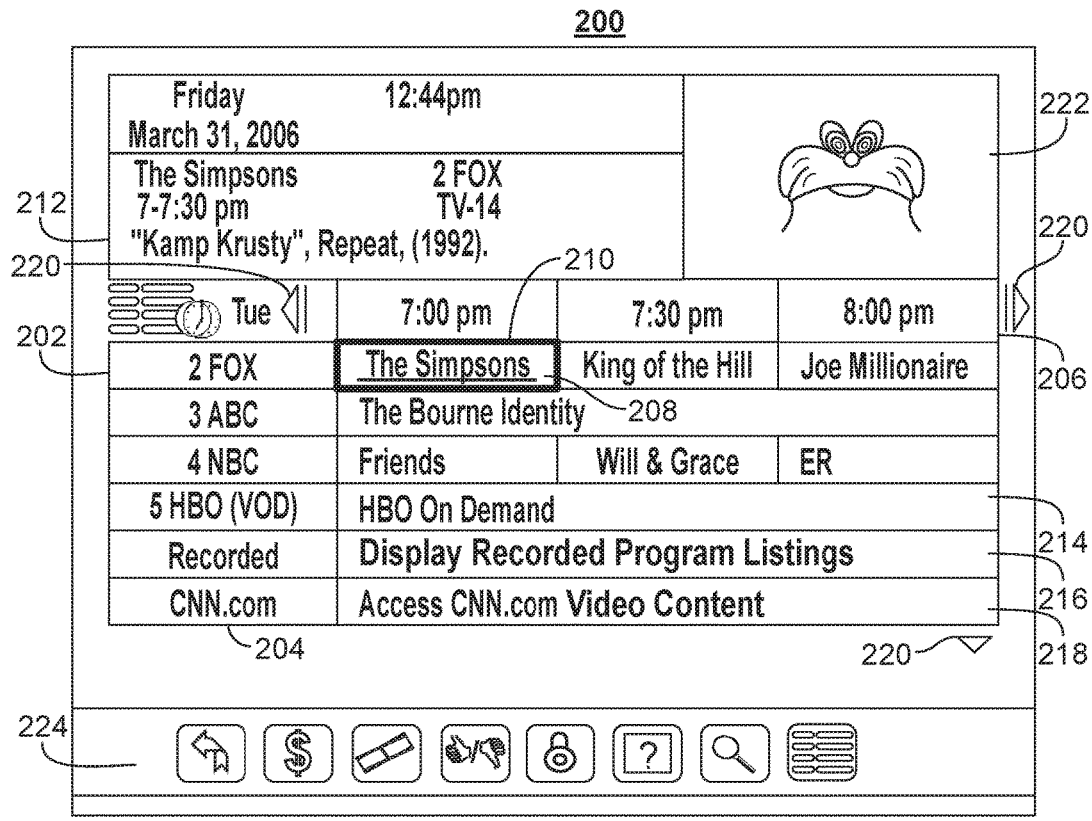
FIG. 2 shows an illustrative example of a display screen generated by a media guidance application in accordance with some embodiments of the disclosure.
Figure 3:
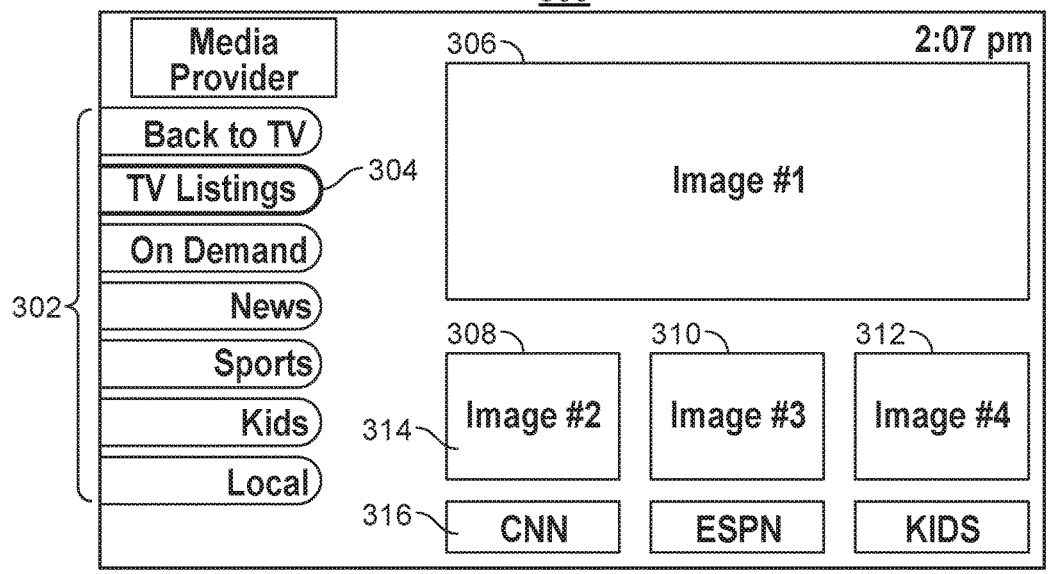
FIG. 3 shows another illustrative example of a display screen generated by a media guidance application in accordance with some embodiments of the disclosure.

The historical data type may be program-based or time-based. If the look-ahead period is greater than six months, schedule data may not be available for the program. For example, schedule data may be in the form of program listings data as illustrated in FIGS. 2 and 3. Alternatively, even with a smaller look-ahead period, schedule data may not be available for the program. In these cases, the historical data type may be assigned as time-based. The predictive model may utilize data corresponding to the daily average audience for that timeslot in order to make its predictions. If schedule data is available for the program, the historical data type may be assigned as program-based.

The look-back period helps determines the amount of training data needed for the model. A look-back period of 12 weeks may be sufficient in the case where the look-ahead period is two weeks or less and the historical data type is time-based. A look-back period of 10 program timeslots or airings may be sufficient in the case where the look-ahead period is two weeks or less and the historical data type is program-based. Alternatively or additionally, the look-back period may be determined based on historical availability of set-top box viewership data and/or ratings data (e.g., Nielsen® ratings data). If the look-ahead period is between two weeks and six months, the look-back period may be the longer of one year and the historical availability of set-top box viewership data and/or ratings data. If the look-ahead period is greater than six months, the look-back period may be the longer of two years and the historical availability of set-top box viewership data and/or ratings data.

The evaluator module 106 evaluates model feasibility and suitability based on the problem characteristics revealed by the characterizer module 104. If the look-ahead period is greater than six months, the evaluator module may select from a Fourier transform model and a Markov model because both are appropriate for long-term predictions. Because the Fourier transform model may require regular time series training data, the evaluator module may select this model if the history granularity and prediction granularity are both determined to be daily. Otherwise, the evaluator module may select the Markov model because it does not require regularity in the training data. If the look-ahead period is between two weeks and six months, the evaluator module may select the Markov model as well. If the look-ahead period is less than two weeks, the evaluator module may select an artificial neural network model because it is better at short-term predictions.

The recommender module 108 assimilates the outputs from the two other modules and makes recommendations based on suitable predictive models. This module may recommend the most desirable machine learning model based on the outputs from the characterizer module 104 and the evaluator module 106. In the event that more than one model is recommended, further research may be performed to efficiently navigate this more compact space and identify the most desirable solution. An artificial neural network model may be recommended for short-term predictions two weeks into the future for each program title. The recommender module may additionally recommend training data and size of the past 10 program airings of program-based viewership. A Fourier transform model may be recommended for long-term predictions six months into the future for daily average audiences. The recommender module may additionally recommend training data and size of the past two years of time-based daily average audiences.

Figure 4:
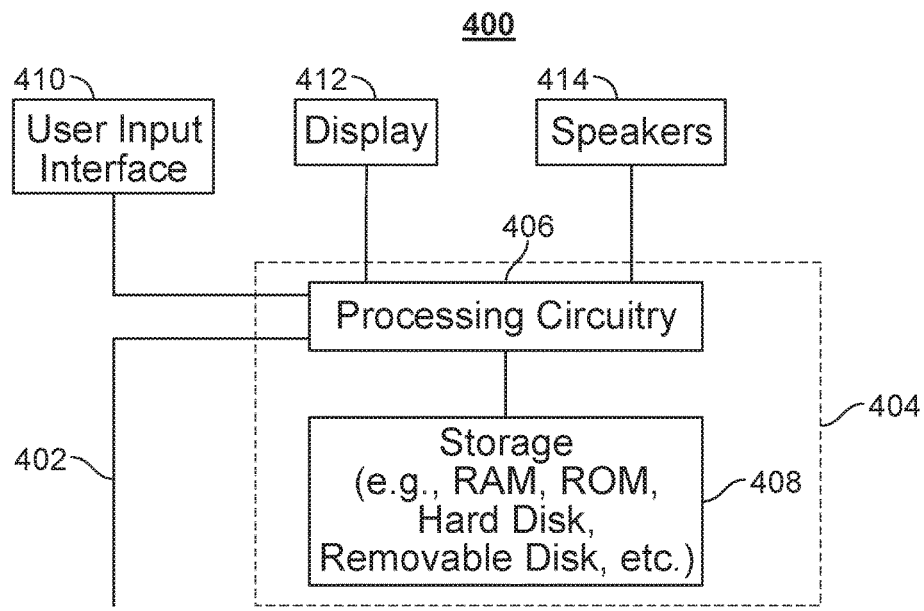
FIG. 4 is a block diagram of an illustrative user equipment device in accordance with some embodiments of the disclosure.
Figure 5:
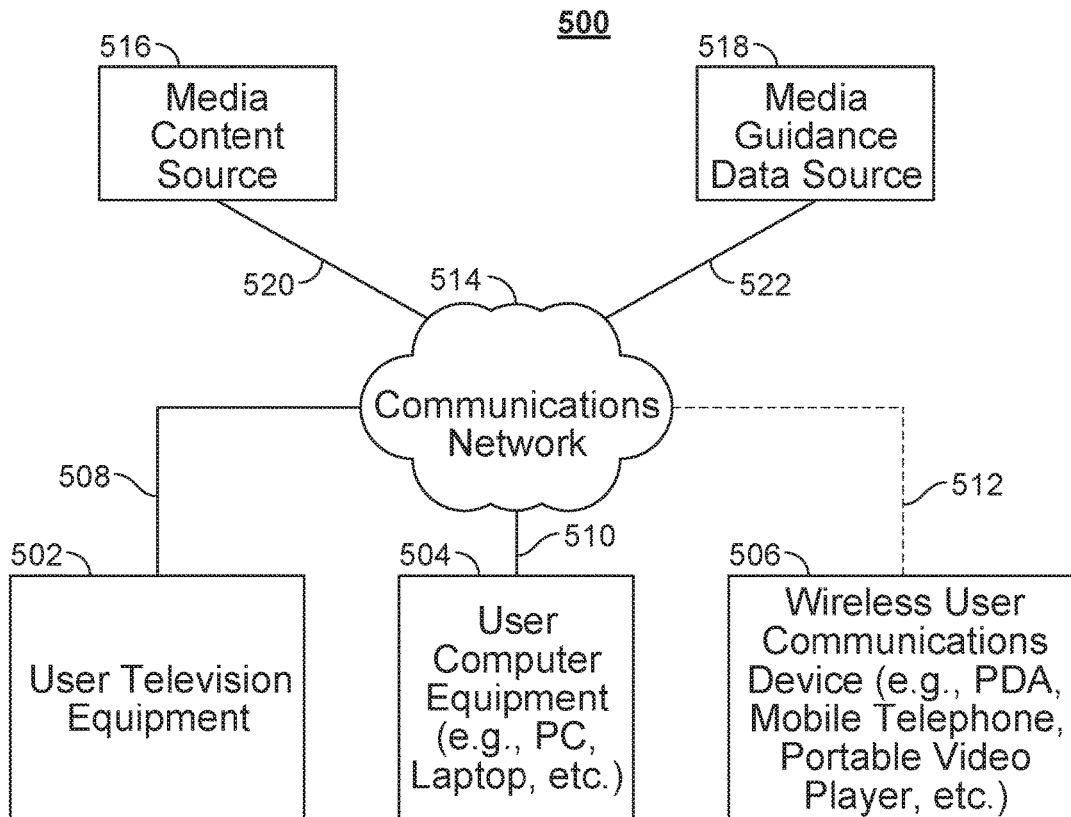
FIG. 5 is a block diagram of an illustrative media system in accordance with some embodiments of the disclosure.

The systems and methods described herein may be implemented in an interactive media guidance application that is executed on control circuitry, e.g., control circuitry 404 (FIG. 4) of one or more user devices, e.g., user equipment device 400 (FIG. 4) and/or one or more servers. For example, the interactive media guidance application may be executed on control circuitry of user television equipment 502 (FIG. 5), user computer equipment 504 (FIG. 5), wireless user communications device 506 (FIG. 5), or another suitable user device. In another example, the interactive media guidance application may be executed on both control circuitry of user television equipment 502 (FIG. 5) and control circuitry of wireless user communications device 506 (FIG. 5). Each user device may execute stand-alone instances of the interactive media guidance application or each user device may execute different portions of the interactive media guidance application.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222 and options region 224. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 224 may allow the user to access different types of content, media guidance application displays, and/or media guidance application features. Options region 224 may be part of display 200 (and other display screens described herein), or may be invoked by a user by selecting an on-screen option or pressing a dedicated or assignable button on a user input device. The selectable options within options region 224 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
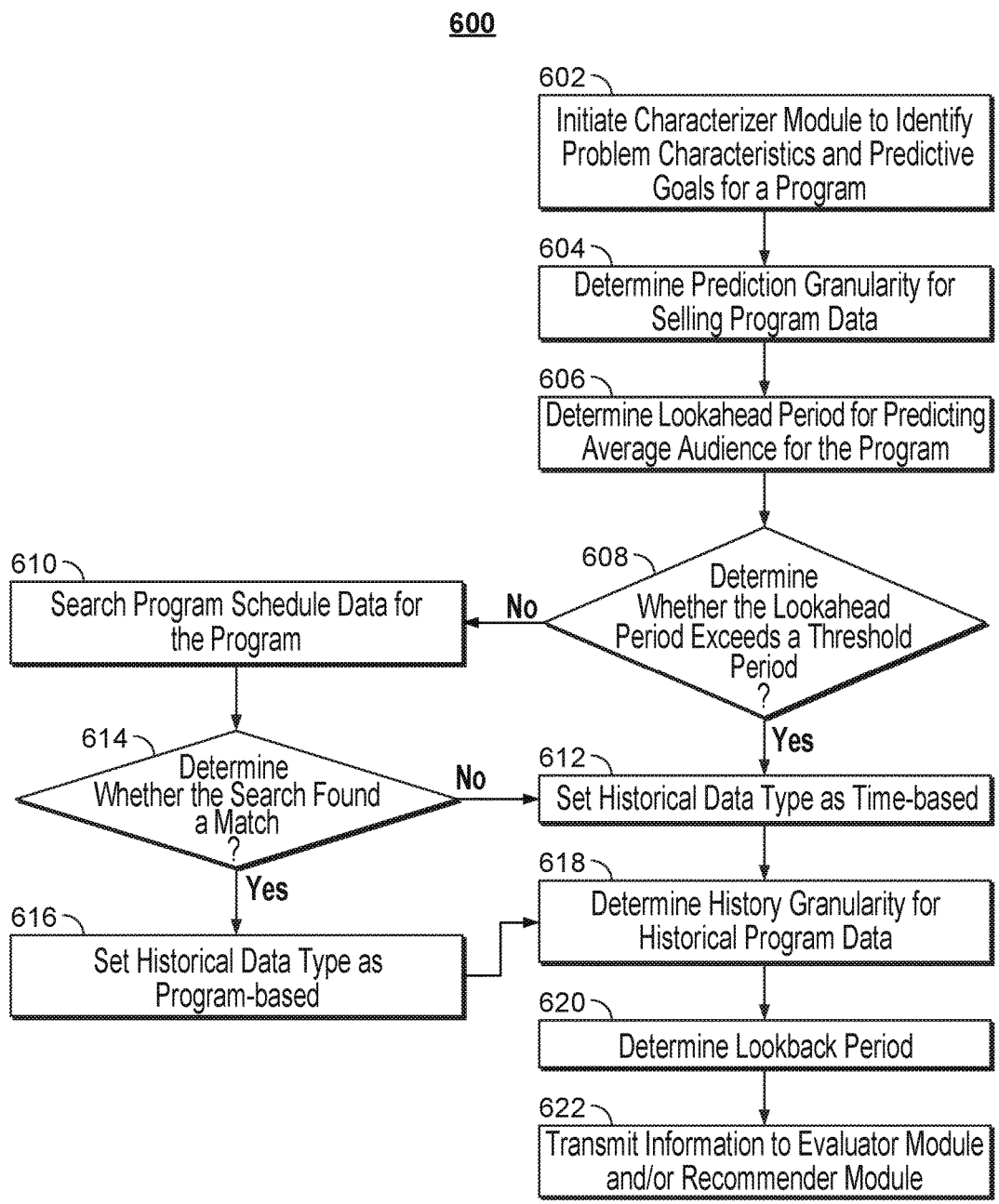
FIG. 6 is a flowchart of an illustrative process for a characterizer module to identify problem characteristics and predictive goals for a program in accordance with some embodiments of the disclosure.

FIG. 6 is a flowchart of illustrative process 600 for an interactive media guidance application implemented on control circuitry (e.g., control circuitry 404, FIG. 4) of a user device (e.g., user equipment device 400, FIG. 4) to execute a characterizer module to identify problem characteristics and predictive goals for a program in accordance with some embodiments of the disclosure. In some embodiments, these algorithms may be encoded onto a non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

At step 602, the interactive media guidance application implemented on control circuitry (e.g., control circuitry 404, FIG. 4) initiates the characterizer module for identifying problem characteristics and predictive goals for a program. In some embodiments, this may be done either directly or indirectly in response to a user action or input (e.g., from signals received by control circuitry 404 or user input interface 410). For example, the process may begin directly in response to control circuitry 404 receiving signals from user input interface 410, or control circuitry 404 may prompt the user to confirm their input using a display (e.g., by generating a prompt to be displayed on display 412) prior to running the algorithm.

At step 604, the interactive media guidance application implemented on control circuitry (e.g., control circuitry 404, FIG. 4) determines a prediction granularity for the selling program data. The prediction granularity is the fluctuation pattern or interval for the prediction, e.g., an average audience for a program. The prediction granularity may be daily, weekly, monthly, quarterly, or another suitable interval.

At step 606, the interactive media guidance application implemented on control circuitry (e.g., control circuitry 404, FIG. 4) determines a look-ahead period (alternatively referred to as a prediction period or a look-ahead period) for predicting an average audience for the program. The prediction look-ahead period is the period between the current date and the future date for the advertisement to be inserted during transmission of the program. For example, the prediction look-ahead period may be one week, 10 weeks, one month, six months, or another suitable period.

At step 608, the interactive media guidance application implemented on control circuitry (e.g., control circuitry 404, FIG. 4) determines whether the look-ahead period exceeds a threshold period. For example, the threshold period may be six months.

At step 610, based on determining that the look-ahead period does not exceed the threshold period, the interactive media guidance application implemented on control circuitry (e.g., control circuitry 404, FIG. 4) searches program schedule data for the program.

At step 612, based on determining that the look-ahead period exceeds the threshold period, the interactive media guidance application implemented on control circuitry (e.g., control circuitry 404, FIG. 4) sets the historical data type as time-based. The time-based historical data type corresponds to data indexed by a timeslot for the program. For example, if the look-ahead period is greater than six months, schedule data may not be available for the program. The predictive model may utilize data corresponding to the daily average audience for that timeslot in order to make its predictions.

At step 614, the interactive media guidance application implemented on control circuitry (e.g., control circuitry 404, FIG. 4) determines whether the search for the program in the program schedule data returned a match. Based on determining that the search did not return a match, the interactive media guidance application, implemented on control circuitry (e.g., control circuitry 404, FIG. 4), returns to step 612 and sets the historical data type as time-based. For example, even with a smaller look-ahead period, schedule data may not be available for the program. In these cases, the historical data type may be assigned as time-based.

At step 616, based on the search returning a match, the interactive media guidance application implemented on control circuitry (e.g., control circuitry 404, FIG. 4) sets the historical data type as program-based. That is, if schedule data is available for the program, the historical data type may be assigned as program-based. The program-based historical data type corresponds to data indexed by a program title.

At step 618, the interactive media guidance application implemented on control circuitry (e.g., control circuitry 404, FIG. 4) determines a history granularity for the historical program data. The history granularity is the interval for sampling the historical program data. For example, the historical program data may have been captured at a daily interval, a weekly interval, a monthly interval, or another suitable interval. The history granularity may be assigned based on a mapping table such that the history granularity is not greater than the prediction granularity. For example, if the prediction granularity is determined to be monthly or quarterly, the history granularity may be assigned as weekly. In another example, if the prediction granularity is determined to be daily or weekly, the history granularity may be assigned as daily.

At step 620, the interactive media guidance application implemented on control circuitry (e.g., control circuitry 404, FIG. 4) determines a look-back period based on the look-ahead period and the historical data type. The look-back period determines the extent to which the historical program data is needed as training data for the model. For example, a look-back period of 12 weeks may be sufficient in the case where the look-ahead period is two weeks or less and the historical data type is time-based. In another example, a look-back period of 10 program timeslots or airings may be sufficient in the case where the look-ahead period is two weeks or less and the historical data type is program-based. In yet another example, the look-back period may be determined based on historical availability of set-top box viewership data and/or ratings data (e.g., Nielsen® ratings data). The set-top box viewership data may be individual respondent level data. The ratings data may be aggregated data from a plurality of respondents. If the look-ahead period is between two weeks and six months, the look-back period may be the longer of one year and the historical availability of set-top box viewership data and/or ratings data. If the look-ahead period is greater than six months, the look-back period may be the longer of two years and the historical availability of set-top box viewership data and/or ratings data.

At step 622, the interactive media guidance application implemented on control circuitry (e.g., control circuitry 404, FIG. 4) transmits the information from process 600 to the evaluator module and/or the recommender module.

It is contemplated that the steps or descriptions of FIG. 6 may be used with any other embodiment of this disclosure. In addition, the descriptions described in relation to the algorithm of FIG. 6 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 6 may be implemented on a combination of appropriately configured software and hardware, and that any of the devices or equipment discussed in relation to FIGS. 4-5 could be used to implement one or more portions of the process.

Figure 7:
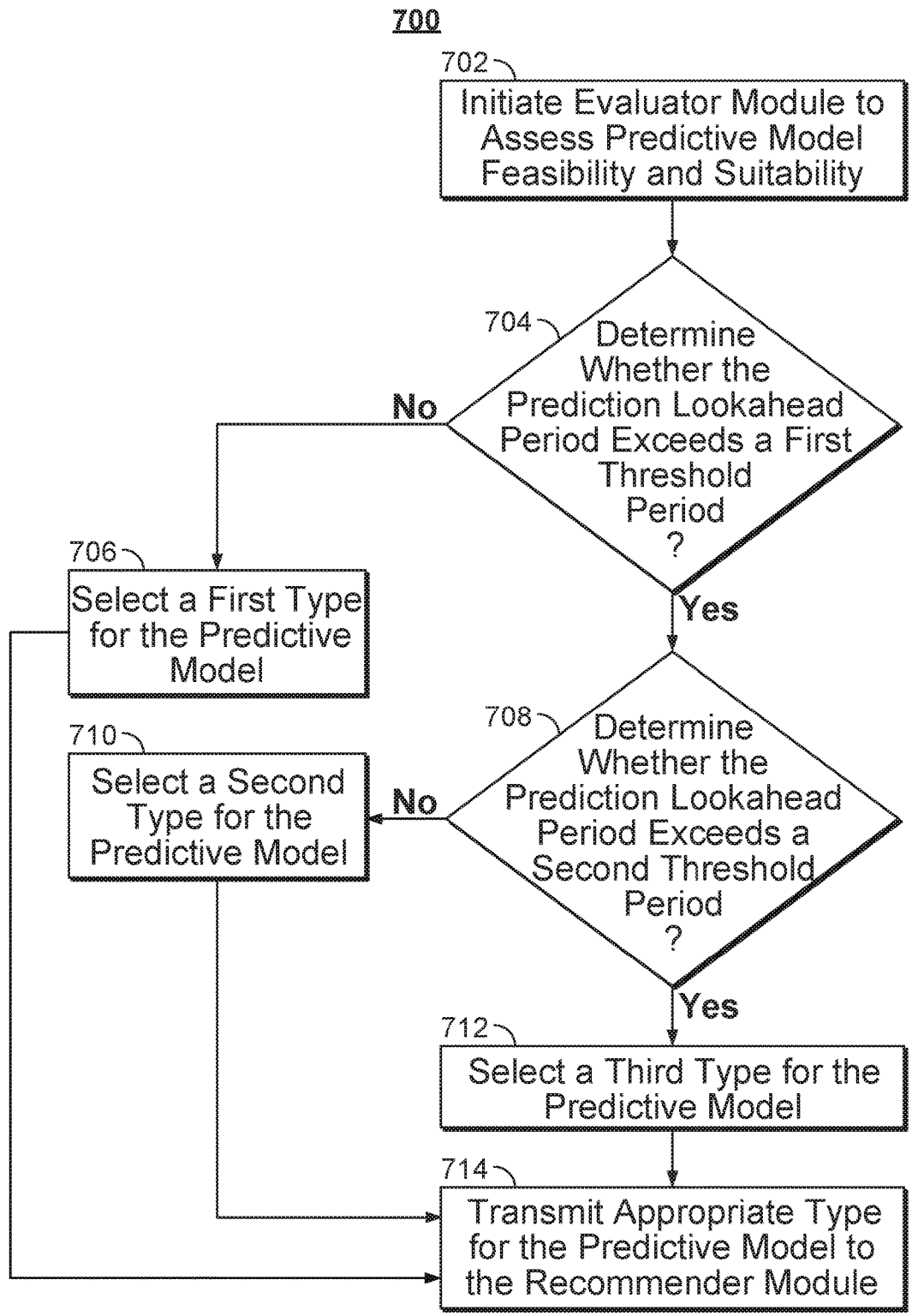
FIG. 7 is a flowchart of an illustrative process for an evaluator module to assess predictive model feasibility and suitability in accordance with some embodiments of the disclosure.

FIG. 7 is a flowchart of illustrative process 700 for an interactive media guidance application implemented on control circuitry (e.g., control circuitry 404, FIG. 4) of a user device (e.g., user equipment device 400, FIG. 4) to execute an evaluator module to assess predictive model feasibility and suitability in accordance with some embodiments of the disclosure. In some embodiments, these algorithms may be encoded onto a non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

At step 702, the interactive media guidance application implemented on control circuitry (e.g., control circuitry 404, FIG. 4) initiates the evaluator module for assessing predictive model feasibility and suitability. In some embodiments, this may be done either directly or indirectly in response to a user action or input (e.g., from signals received by control circuitry 404 or user input interface 410). For example, the process may begin directly in response to control circuitry 404 receiving signals from user input interface 410, or control circuitry 404 may prompt the user to confirm their input using a display (e.g., by generating a prompt to be displayed on display 412) prior to running the algorithm.

At step 704, the interactive media guidance application implemented on control circuitry (e.g., control circuitry 404, FIG. 4) determines whether the prediction look-ahead period exceeds a first threshold period. For example, the first threshold period may be two weeks.

At step 706, based on determining that the prediction look-ahead period does not exceed the first threshold period, the interactive media guidance application implemented on control circuitry (e.g., control circuitry 404, FIG. 4) selects a first type for the predictive model. For example, if the look-ahead period is less than two weeks, the interactive media guidance application may select an artificial neural network model type because it is better at short-term predictions.

At step 708, based on determining that the prediction look-ahead period exceeds the first threshold period, the interactive media guidance application implemented on control circuitry (e.g., control circuitry 404, FIG. 4) determines whether the prediction look-ahead period exceeds a second threshold period. For example, the second threshold period may be six months.

At step 710, based on determining that the prediction look-ahead period does not exceed the second threshold period, the interactive media guidance application implemented on control circuitry (e.g., control circuitry 404, FIG. 4) selects a second type for the predictive model. For example, if the look-ahead period is between two weeks and six months, the evaluator module may select a Markov model type.

At step 712, based on determining that the prediction look-ahead period exceeds the second threshold period, the interactive media guidance application implemented on control circuitry (e.g., control circuitry 404, FIG. 4) selects a third type for the predictive model. For example, if the look-ahead period is greater than six months, the evaluator module may select from a Fourier transform model and a Markov model because both are appropriate for long-term predictions. In some embodiments, because the Fourier transform model may require regular time series training data, the evaluator module may select this model if the history granularity and prediction granularity are both determined to be daily. Otherwise, the evaluator module may select the Markov model because it does not require regularity in the training data.

At step 714, the interactive media guidance application implemented on control circuitry (e.g., control circuitry 404, FIG. 4) transmits the appropriate type for the predictive model from process 700 to the recommender module.

It is contemplated that the steps or descriptions of FIG. 7 may be used with any other embodiment of this disclosure. In addition, the descriptions described in relation to the algorithm of FIG. 7 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 7 may be implemented on a combination of appropriately configured software and hardware, and that any of the devices or equipment discussed in relation to FIGS. 4-5 could be used to implement one or more portions of the process.

Figure 8:
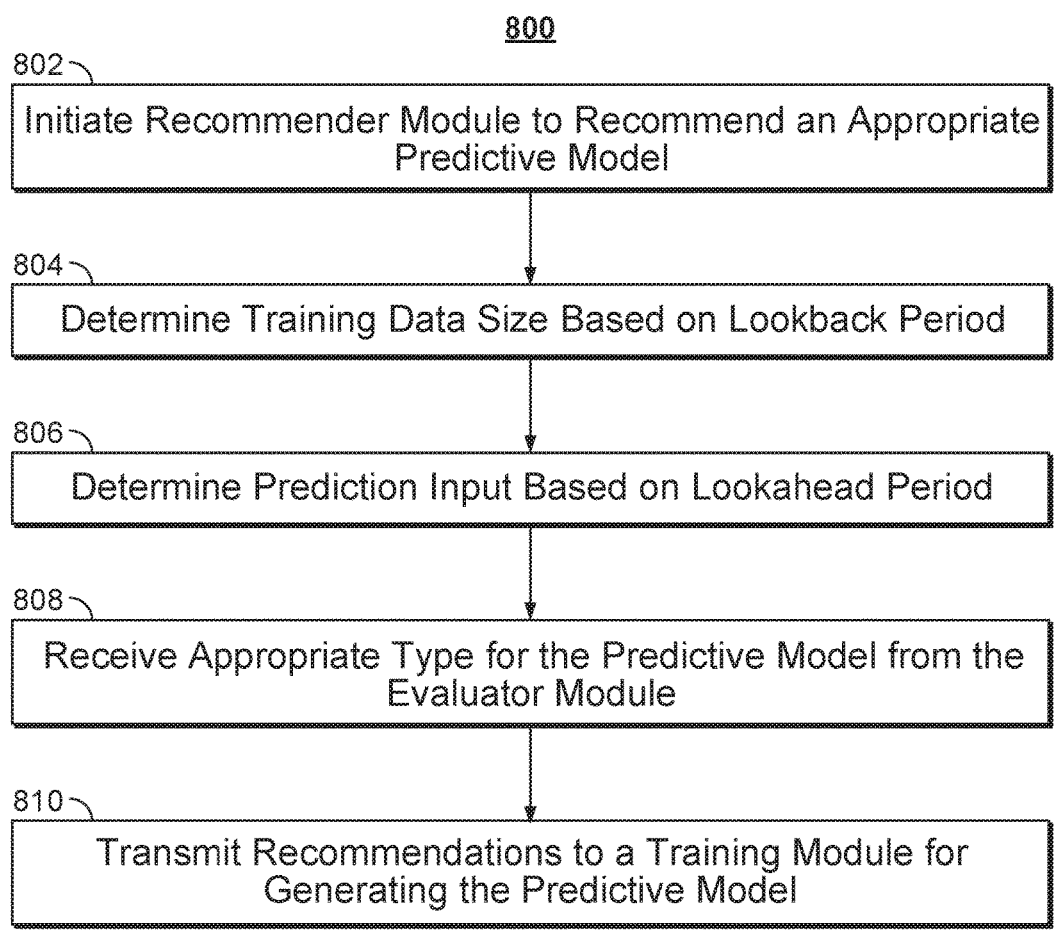
FIG. 8 is a flowchart of an illustrative process for a recommender module to recommend an appropriate predictive model in accordance with some embodiments of the disclosure.

FIG. 8 is a flowchart of illustrative process 800 for an interactive media guidance application implemented on control circuitry (e.g., control circuitry 404, FIG. 4) of a user device (e.g., user equipment device 400, FIG. 4) to execute a recommender module to recommend an appropriate predictive model in accordance with some embodiments of the disclosure. In some embodiments, these algorithms may be encoded onto a non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

At step 802, the interactive media guidance application implemented on control circuitry (e.g., control circuitry 404, FIG. 4) initiates the recommender module for recommending an appropriate predictive model. In some embodiments, this may be done either directly or indirectly in response to a user action or input (e.g., from signals received by control circuitry 404 or user input interface 410). For example, the process may begin directly in response to control circuitry 404 receiving signals from user input interface 410, or control circuitry 404 may prompt the user to confirm their input using a display (e.g., by generating a prompt to be displayed on display 412) prior to running the algorithm.

At step 804, the interactive media guidance application implemented on control circuitry (e.g., control circuitry 404, FIG. 4) determines the training data size based on the look-back period. The look-back period determines the extent to which the historical program data is needed as training data for the model. For example, a look-back period of 12 weeks may be sufficient in the case where the look-ahead period is two weeks or less and the historical data type is time-based. In another example, a look-back period of 10 program timeslots or airings may be sufficient in the case where the look-ahead period is two weeks or less and the historical data type is program-based. In yet another example, the look-back period may be determined based on historical availability of set-top box viewership data and/or ratings data (e.g., Nielsen® ratings data). The set-top box viewership data may be individual respondent level data. The ratings data may be aggregated data from a plurality of respondents. If the look-ahead period is between two weeks and six months, the look-back period may be the longer of one year and the historical availability of set-top box viewership data and/or ratings data. If the look-ahead period is greater than six months, the look-back period may be the longer of two years and the historical availability of set-top box viewership data and/or ratings data.

At step 806, the interactive media guidance application implemented on control circuitry (e.g., control circuitry 404, FIG. 4) determines the prediction input based on the look-ahead period. At step 808, the interactive media guidance application implemented on control circuitry (e.g., control circuitry 404, FIG. 4) receives the appropriate type for the predictive model from process 700 for the evaluator module. For example, a Fourier transform model may be recommended for long-term predictions using regular daily viewership data (i.e., time-based) without the knowledge of program level information (i.e., program-based). In another example, an artificial neural network model may be recommended for short-term predictions two weeks into the future for each program title. The recommender module may additionally recommend training data and size of the past 10 program airings of program-based viewership. In yet another example, a Fourier transform model may be recommended for long-term predictions six months into the future for daily average audiences. The recommender module may additionally recommend training data and size of the past two years of time-based daily average audiences.

At step 810, the interactive media guidance application implemented on control circuitry (e.g., control circuitry 404, FIG. 4) transmits recommendations to a training module for generating the predictive model.

It is contemplated that the steps or descriptions of FIG. 8 may be used with any other embodiment of this disclosure. In addition, the descriptions described in relation to the algorithm of FIG. 8 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 4-5 could be used to implement one or more portions of the process.

Figure 9:
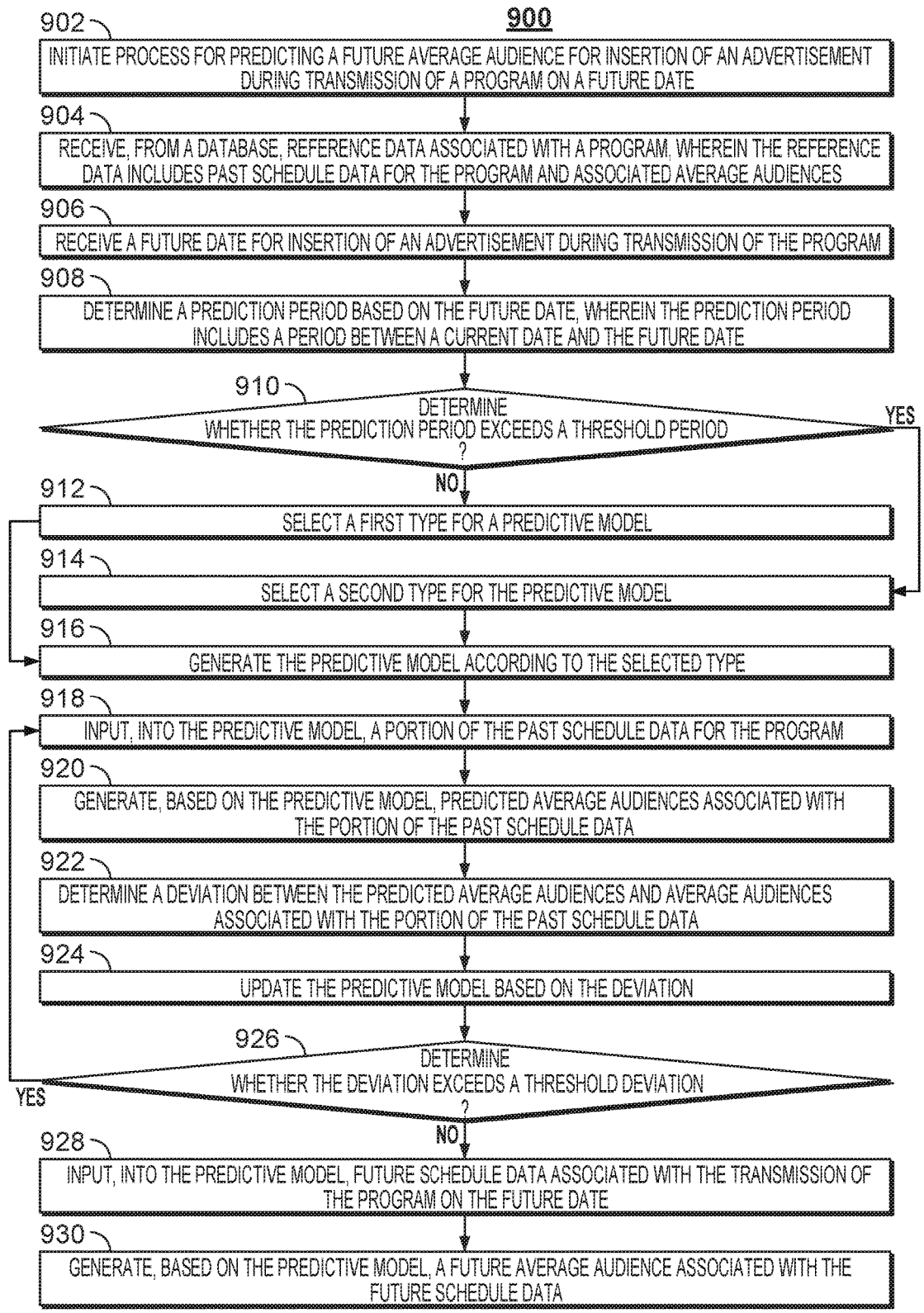
FIG. 9 is a flowchart of an illustrative process for predicting an average audience (or a size of program viewing audience) that can inform a future advertisement rate for insertion of an advertisement during transmission of a program on a future date in accordance with some embodiments of the disclosure.

FIG. 9 is a flowchart of illustrative process 900 for an interactive media guidance application implemented on control circuitry (e.g., control circuitry 404, FIG. 4) of a user device (e.g., user equipment device 400, FIG. 4) to predict an average audience (or a size of program viewing audience) that can inform a future advertisement rate for insertion of an advertisement during transmission of a program on a future date in accordance with some embodiments of the disclosure. In some embodiments, process 900 is implemented based on processes 600, 700, and 800 described above. In some embodiments, these algorithms may be encoded onto a non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

At step 902, the interactive media guidance application implemented on control circuitry (e.g., control circuitry 404, FIG. 4) initiates the process to predict an average audience (or a size of program viewing audience) that can inform a future advertisement rate for insertion of an advertisement during transmission of a program on a future date. In some embodiments, this may be done either directly or indirectly in response to a user action or input (e.g., from signals received by control circuitry 404 or user input interface 410). For example, the process may begin directly in response to control circuitry 404 receiving signals from user input interface 410, or control circuitry 404 may prompt the user to confirm their input using a display (e.g., by generating a prompt to be displayed on display 412) prior to running the algorithm.

At step 904, the interactive media guidance application implemented on control circuitry (e.g., control circuitry 404, FIG. 4) receives, from a database, reference data associated with a program. The reference data includes past schedule data for the program and associated average audiences.

At step 906, the interactive media guidance application implemented on control circuitry (e.g., control circuitry 404, FIG. 4) receives a future date for insertion of an advertisement during transmission of the program.

At step 908, the interactive media guidance application implemented on control circuitry (e.g., control circuitry 404, FIG. 4) determines a prediction period based on the future date. The prediction period includes a period between a current date and the future date. For example, the prediction period may be the period between the current date and the future date for the advertisement to be inserted during transmission of the program. The prediction period may be one week, 10 weeks, one month, six months, or another suitable period.

At step 910, the interactive media guidance application implemented on control circuitry (e.g., control circuitry 404, FIG. 4) determines whether the prediction period exceeds a threshold period. For example, the threshold period may be two weeks.

At step 912, based on determining that the prediction period does not exceed the threshold period, the interactive media guidance application implemented on control circuitry (e.g., control circuitry 404, FIG. 4) selects a first type for a predictive model. In some embodiments, the first type of the predictive model is suitable for a short-term prediction during a period that does not exceed the threshold period. For example, the threshold period may be two weeks and predictions for a period of two weeks or less may be considered to be short-term predictions. The first type of predictive model may be an artificial neural network suitable for short-term predictions.

At step 914, based on determining that the prediction period exceeds the threshold period, the interactive media guidance application implemented on control circuitry (e.g., control circuitry 404, FIG. 4) selects a second type for the predictive model. In some embodiments, the second type of the predictive model is suitable for a long-term prediction during a period that exceeds the threshold period. For example, the threshold period may be two weeks and predictions for a period of greater than two weeks may be considered to be long-term predictions. The second type of predictive model may be a Markov model network suitable for long-term predictions.

At step 916, the interactive media guidance application implemented on control circuitry (e.g., control circuitry 404, FIG. 4) generates the predictive model according to the selected type. In some embodiments, the interactive media guidance application generates the predictive model according to the selected type by initializing one or more parameters of the predictive model to a random value. For example, the interactive media guidance application may set the weights of an artificial neural network to random values in order to initialize the artificial neural network.

At step 918, the interactive media guidance application implemented on control circuitry (e.g., control circuitry 404, FIG. 4) inputs, into the predictive model, a portion of the past schedule data for the program from the reference data. In some embodiments, the portion of the past schedule data for the program is selected based on the look-back period. The look-back period determines the extent to which the historical program data is needed as training data for the model.

In some embodiments, the interactive media guidance application determines a look-back period based on the prediction period and the historical data type. For example, a look-back period of 12 weeks may be sufficient in the case where the prediction period is two weeks or less and the historical data type is time-based. In another example, a look-back period of 10 program timeslots or airings may be sufficient in the case where the prediction period is two weeks or less and the historical data type is program-based. In yet another example, the look-back period may be determined based on historical availability of set-top box viewership data and/or ratings data (e.g., Nielsen® ratings data). The set-top box viewership data may be individual respondent level data. The ratings data may be aggregated data from a plurality of respondents. If the prediction period is between two weeks and six months, the look-back period may be the longer of one year and the historical availability of set-top box viewership data and/or ratings data. If the prediction period is greater than six months, the look-back period may be the longer of two years and the historical availability of set-top box viewership data and/or ratings data.

At step 920, the interactive media guidance application implemented on control circuitry (e.g., control circuitry 404, FIG. 4) generates, based on the predictive model, predicted average audiences associated with the portion of the past schedule data.

At step 922, the interactive media guidance application implemented on control circuitry (e.g., control circuitry 404, FIG. 4) determines a deviation between the predicted average audiences and average audiences associated with the portion of the past schedule data.

At step 924, the interactive media guidance application implemented on control circuitry (e.g., control circuitry 404, FIG. 4) updates the predictive model based on the deviation.

At step 926, the interactive media guidance application implemented on control circuitry (e.g., control circuitry 404, FIG. 4) determines whether the deviation exceeds a threshold deviation. Based on determining that the deviation exceeds the threshold deviation, the interactive media guidance application implemented on control circuitry (e.g., control circuitry 404, FIG. 4) returns to step 918. In this case, the interactive media guidance application retrains the predictive model. For example, if the deviation exceeds the threshold deviation, the predictive model may not be accurate enough to be usable for future predictions. By retraining the model on the same training data, the deviation may be reduced and the predictive model may be made more accurate. In some embodiments, the interactive media guidance application retrains the predictive model by performing the following steps. The interactive media guidance application inputs, into the predictive model, the portion of the past schedule data for the program from the reference data. The interactive media guidance application generates, based on the predictive model, second predicted average audiences associated with the portion of the past schedule data. The interactive media guidance application determines a second deviation between the second predicted average audiences and the average audiences associated with the portion of the past schedule data. The interactive media guidance application updates the predictive model based on the second deviation.

At step 928, based on determining that the deviation does not exceed the threshold deviation, the interactive media guidance application implemented on control circuitry (e.g., control circuitry 404, FIG. 4) inputs, into the predictive model, future schedule data associated with the transmission of the program on the future date.

At step 930, the interactive media guidance application implemented on control circuitry (e.g., control circuitry 404, FIG. 4) generates, based on the predictive model, the future average audience associated with the future schedule data.

In some embodiments, the interactive media guidance application determines whether the prediction period exceeds a second threshold period. Based on determining that the prediction period exceeds the second threshold period, the interactive media guidance application designates the historical data type to be time-based. The time-based historical data type corresponds to data indexed by a timeslot for the program. For example, if the prediction period is greater than six months, schedule data may not be available for the program. In this case, the historical data type may be assigned as time-based. The predictive model may utilize data corresponding to the daily average audience for that timeslot in order to make its predictions.

In some embodiments, based on determining that the prediction period does not exceed the second threshold period, the interactive media guidance application transmits, to the database, a search request for future schedule data for the program. Based on receiving no future schedule data for the program, the interactive media guidance application designates a historical data type to be time-based. Based on receiving the future schedule data for the program, the interactive media guidance application designates the historical data type to be program-based. The program-based historical data type corresponds to data indexed by a program title. For example, if schedule data is available for the program, the historical data type may be assigned as program-based. If schedule data is not available for the program, the historical data type may be assigned as time-based.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 4-5 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for selecting a predictive model for predicting an average audience size at a future date, based on data quality and time until the future date, the method comprising:
   receiving the future date for which to predict a future average audience size;
   receiving, from a database, reference data associated with a program to be transmitted on the future date, wherein the reference data includes past schedule data for the program and an associated average audience size;
   determining a prediction period between a current date and the future date;
   determining, for the reference data, a granularity indicative of how often information of the past schedule data was measured;
   retrieving, from memory, a plurality of predictive models;
   determining, for a predictive model of the plurality of predictive models, a minimum granularity and maximum prediction period;
   determining whether (1) the prediction period is less than the maximum prediction period and (2) the granularity is greater than the minimum granularity;
   in response to determining that (1) the prediction period is less than the maximum prediction period and (2) the granularity is greater than the minimum granularity, selecting the predictive model of the plurality of predictive models;
   subsequent to the selecting, training the predictive model by:
      inputting, into the predictive model, a portion of the past schedule data for the program from the reference data;
      generating, based on the predictive model, a predicted average audience size associated with the portion of the past schedule data;
      determining a deviation between the predicted average audience size and an average audience size associated with the portion of the past schedule data; and
      updating the predictive model based on the deviation; and
   subsequent to the training of the predictive model, predicting the future average audience size by:
      inputting, into the predictive model, future schedule data associated the program on the future date; and
      generating, based on the predictive model, the future average audience size associated with the future schedule data.

2. The method of claim 1, prior to predicting the future average audience size, comprising:
   determining whether the deviation exceeds a threshold deviation;
   based on determining that the deviation exceeds the threshold deviation, retraining the predictive model.

3. The method of claim 2, wherein retraining the predictive model comprises:
   inputting, into the predictive model, the portion of the past schedule data for the program from the reference data;
   generating, based on the predictive model, a second predicted average audience size associated with the portion of the past schedule data;
   determining a second deviation between the second predicted average audience size and the average audience size associated with the portion of the past schedule data;
   updating the predictive model based on the second deviation.

4. The method of claim 1, further comprising initializing one or more parameters of the predictive model to a random value.

5. The method of claim 1, wherein the plurality of predictive models comprises a first predictive model that is suitable for a short-term prediction indicated by a smaller prediction period.

6. The method of claim 1, wherein the plurality of predictive models comprises a second predictive model that is suitable for a long-term prediction indicated by a larger prediction period.

7. The method of claim 1, comprising:
   determining whether the prediction period exceeds a second threshold period;
   based on determining that the prediction period exceeds the second threshold period, designating historical data type of the reference data to be time-based.

8. The method of claim 7, comprising:
   based on determining that the prediction period does not exceed the second threshold period:
      based on receiving no future schedule data for the program, designating a historical data type to be time-based;

based on receiving the future schedule data for the program, designating the historical data type to be program-based.

9. The method of claim 8, comprising determining a look-back period based on the prediction period and the historical data type.

10. The method of claim 9, wherein the portion of the past schedule data for the program is selected based on the look-back period.

11. A system for selecting a predictive model for predicting an average audience size at a future date, based on data quality and time until the future date, comprising control circuitry configured to:
receive the future date for which to predict a future average audience size;
receive, from a database, reference data associated with a program to be transmitted on the future date, wherein the reference data includes past schedule data for the program and an associated average audience size;
determine a prediction period between a current date and the future date;
determine, for the reference data, a granularity indicative of how often information of the past schedule data was measured;
retrieve, from memory, a plurality of predictive models;
determine, for a predictive model of the plurality of predictive models, a minimum granularity and maximum prediction period;
determine whether (1) the prediction period is less than the maximum prediction period and (2) the granularity is greater than the minimum granularity;
in response to determining that (1) the prediction period is less than the maximum prediction period and (2) the granularity is greater than the minimum granularity, select the predictive model of the plurality of predictive models;
subsequent to the selecting, train the predictive model by:
inputting, into the predictive model, a portion of the past schedule data for the program from the reference data;
generating, based on the predictive model, a predicted average audience size associated with the portion of the past schedule data;
determining a deviation between the predicted average audience size and an average audience size associated with the portion of the past schedule data; and
updating the predictive model based on the deviation; and
subsequent to the training of the predictive model, predicting the future average audience size by:
inputting, into the predictive model, future schedule data associated with the program on the future date; and
generating, based on the predictive model, the future average audience size associated with the future schedule data.

12. The system of claim 11, prior to predicting the future average audience size, wherein the control circuitry is configured to:
determine whether the deviation exceeds a threshold deviation;
based on determining that the deviation exceeds the threshold deviation, retrain the predictive model.

13. The system of claim 12, wherein the control circuitry configured to retrain the predictive model comprises the control circuitry configured to:
input, into the predictive model, the portion of the past schedule data for the program from the reference data;
generate, based on the predictive model, a second predicted average audience size associated with the portion of the past schedule data;
determine a second deviation between the second predicted average audience size and the average audience size associated with the portion of the past schedule data;
update the predictive model based on the second deviation.

14. The system of claim 11, wherein the control circuitry is further configured to initialize one or more parameters of the predictive model to a random value.

15. The system of claim 11, wherein the plurality of predictive models comprises a first predictive model that is suitable for a short-term prediction indicated by a smaller prediction period.

16. The system of claim 11, wherein the plurality of predictive models comprises a second predictive model that is suitable for a long-term prediction indicated by a larger prediction period.

17. The system of claim 11, wherein the control circuitry is configured to:
determine whether the prediction period exceeds a second threshold period;
based on determining that the prediction period exceeds the second threshold period, designate a historical data type of the reference data to be time-based.

18. The system of claim 17, wherein the control circuitry is configured to:
based on determining that the prediction period does not exceed the second threshold period:
based on receiving no future schedule data for the program, designate a historical data type to be time-based;
based on receiving the future schedule data for the program, designate the historical data type to be program-based.

19. The system of claim 18, wherein the control circuitry is configured to determine a look-back period based on the prediction period and the historical data type.

20. The system of claim 19, wherein the portion of the past schedule data for the program is selected based on the look-back period.

21. A method for predicting an average audience that can inform a future advertisement rate for insertion of an advertisement during transmission of a program on a future date, the method comprising:
receiving the future date for which to predict a future average audience size;
receiving, from a database, reference data associated with a program to be transmitted on the future date, wherein the reference data includes past schedule data for the program and an associated average audience size;
determining a prediction period between a current date and the future date;
determining whether the prediction period exceeds a threshold period;
based on determining that the prediction period does not exceed the threshold period, selecting a first type for a predictive model;
based on determining that the prediction period exceeds the threshold period, selecting a second type for the predictive model different than the first type;
determining whether the prediction period exceeds a second threshold period;

based on determining that the prediction period exceeds the second threshold period, designating a historical data type of the reference data to be time-based;

subsequent to the selecting one of the first type and the second type, training the predictive model by:
  inputting, into the predictive model, a portion of the past schedule data for the program from the reference data;
  generating, based on the predictive model, a predicted average audience size associated with the portion of the past schedule data;
  determining a deviation between the predicted average audience size and an average audience size associated with the portion of the past schedule data; and
  updating the predictive model based on the deviation; and subsequent to the training of the predictive model, predicting the future average audience size by:
  inputting, into the predictive model, future schedule data associated the program on the future date; and
  generating, based on the predictive model, the future average audience size associated with the future schedule data.

22. The method of claim 21, further comprising:
in response to determining that the prediction period does not exceed the second threshold period:
  based on receiving no future schedule data for the program, designating a historical data type to be time-based;
  based on receiving the future schedule data for the program, designating the historical data type to be program-based.

23. The method of claim 22, comprising determining a look-back period based on the prediction period and the historical data type.

24. The method of claim 23, wherein the portion of the past schedule data for the program is selected based on the look-back period.

25. A system for predicting an average audience size that can inform a future advertisement rate for insertion of an advertisement during transmission of a program on a future date, the system comprising control circuitry configured to:
  receive the future date for which to predict a future average audience size;
  receive, from a database, reference data associated with a program to be transmitted on the future date, wherein the reference data includes past schedule data for the program and an associated average audience size;
  determine a prediction period between a current date and the future date;
  determine whether the prediction period exceeds a threshold period;
  based on determining that the prediction period does not exceed the threshold period, select a first type for a predictive model;
  based on determining that the prediction period exceeds the threshold period, select a second type for the predictive model different than the first type;
  determine whether the prediction period exceeds a second threshold period;
  based on determining that the prediction period exceeds the second threshold period, designate a historical data type of the reference data to be time-based;
  subsequent to the selecting one of the first type and the second type, train the predictive model by:
    inputting, into the predictive model, a portion of the past schedule data for the program from the reference data;
    generating, based on the predictive model, a predicted average audience size associated with the portion of the past schedule data;
    determining a deviation between the predicted average audience size and an average audience size associated with the portion of the past schedule data; and
    updating the predictive model based on the deviation; and
  subsequent to the training of the predictive model, predict the future average audience size by:
    inputting, into the predictive model, future schedule data associated the program on the future date; and
    generating, based on the predictive model, the future average audience size associated with the future schedule data.

26. The system of claim 25, wherein the control circuitry is configured to:
based on determining that the prediction period does not exceed the second threshold period:
  based on receiving no future schedule data for the program, designate a historical data type to be time-based;
  based on receiving the future schedule data for the program, designate the historical data type to be program-based.

27. The system of claim 26, wherein the control circuitry is configured to determine a look-back period based on the prediction period and the historical data type.

28. The system of claim 27, wherein the portion of the past schedule data for the program is selected based on the look-back period.

* * * * *

UNITED STATES PATENT AND TRADEMARK OFFICE
CERTIFICATE OF CORRECTION

PATENT NO. : 10,423,979 B2
APPLICATION NO. : 15/393722
DATED : September 24, 2019
INVENTOR(S) : Xiaoxi Xu et al.

Page 1 of 1

It is certified that error appears in the above-identified patent and that said Letters Patent is hereby corrected as shown below:

In the Claims

Column 32, Claim 7, Line 60, please insert --a-- before "historical".

Signed and Sealed this
Fourth Day of August, 2020

Andrei Iancu
*Director of the United States Patent and Trademark Office*